(12) United States Patent
Pfandl et al.

(10) Patent No.: US 10,408,259 B1
(45) Date of Patent: Sep. 10, 2019

(54) SELF-ALIGNING ROLLER BEARING

(71) Applicant: Aktiebolaget SKF, Gothenburg (SE)

(72) Inventors: Erich Pfandl, Zeltweg (AT); Christian Cirar, Fohnsdorf (AT); Hakan Freden, Nödinge (SE); Christian Kogler, Oberkurzheim (AT); Daniel Ortega, Göteborg (SE)

(73) Assignee: AKTIEBOLAGET SKF, Gothenburg (SE)

( * ) Notice: Subject to any disclaimer, the term of this patent is extended or adjusted under 35 U.S.C. 154(b) by 22 days.

(21) Appl. No.: 15/879,599

(22) Filed: Jan. 25, 2018

(51) Int. Cl.
*F16C 23/08* (2006.01)
*F16C 43/04* (2006.01)
*F16C 19/38* (2006.01)
*F16C 19/50* (2006.01)
*F16C 19/28* (2006.01)

(52) U.S. Cl.
CPC ............. *F16C 19/38* (2013.01); *F16C 19/28* (2013.01); *F16C 19/50* (2013.01); *F16C 23/086* (2013.01)

(58) Field of Classification Search
CPC .......... F16C 19/28; F16C 19/38; F16C 23/08; F16C 23/086; F16C 33/585; F16C 33/7886; F16C 43/06
See application file for complete search history.

(56) References Cited

U.S. PATENT DOCUMENTS 4,787,758 A * 11/1988 Jacob ................. F16C 19/26
29/898.062

FOREIGN PATENT DOCUMENTS

| DE | 2407477 A1 | * | 8/1975 | .............. F16C 43/06 |
| GB | 1505135 A | * | 3/1978 | .............. F16C 19/28 |
| JP | 2005061594 A | * | 3/2005 | ............ F16C 23/086 |

* cited by examiner

*Primary Examiner* — Phillip A Johnson
(74) *Attorney, Agent, or Firm* — Bryan Peckjian; SKF USA Inc. Patent Dept.

(57) ABSTRACT

A self-aligning roller bearing having inner and outer bearing ring elements and at least one row of roller elements disposed in between. The inner bearing ring element having a retaining flange provided on a first axial side of the roller bearing being configured for preventing the roller elements from falling out from the roller bearing. The roller bearing having a first sealing ring element located at the first axial side for sealing the first axial opening, the first sealing ring being rotatable in relation to the inner bearing ring and seals against a sealing mating surface of the inner bearing ring. The retaining flange has at least one filling slot configured for allowing the roller elements to be inserted in-between the inner and the outer bearing ring elements during assembly of the roller bearing, and the sealing mating surface being axially outside the at least one filling slot.

10 Claims, 3 Drawing Sheets

PRIOR ART

SELF-ALIGNING ROLLER BEARING

TECHNOLOGICAL FIELD

The present disclosure relates to a self-aligning roller bearing. More particularly, the present disclosure relates to a self-aligning roller bearing comprising at least one sealing ring element for sealing off a space between an inner and an outer bearing ring element of the roller bearing.

BACKGROUND

Rolling element bearings are well known mechanical components which are used for rotatably supporting for example shafts or axles in rotating applications. There are different types of rolling element bearings, comprising rollers and/or balls as the rolling elements.

One common type of rolling bearing is a self-aligning roller bearing which is known for its ability to accommodate large loads and also shaft misalignments. The outer and inner bearing rings are designed such that they can be relatively misaligned in respect of the bearing's rotation axis. The self-aligning capability is accomplished by the use of barrel-shaped rollers and corresponding raceway surfaces on the respective outer and inner bearing ring. The bearing may for example be configured as a single-row or a double-row roller bearing.

Self-aligning roller bearings may be equipped with sealing rings for preventing debris/contaminants from entering the bearing and also for accommodating lubrication within the bearing. One such bearing is for example known from the U.S. Pat. No. 8,979,386 B2 disclosing a rolling-element bearing comprising a sealing element being removably attached to an axial end side of the bearing.

SUMMARY

In view of the above, an object of the present invention is to provide an improved self-aligning roller bearing. More particularly, an object of the present invention is to provide a self-aligning roller bearing having an improved sealing and lubrication functionality, and also which facilitates assembly/disassembly of the bearing.

The above-mentioned and other objects are at least partially provided by the subject matter as disclosed in claim 1. Preferred and advantageous embodiments may be found in the dependent claims and in the corresponding description and drawings.

According to the invention, the above-mentioned and other objects are at least partially provided by a self-aligning roller bearing comprising an inner bearing ring element, an outer bearing ring element and at least one row of roller elements interposed in-between the inner and the outer bearing ring elements. The inner bearing ring element comprises a retaining flange provided on a first axial side of the roller bearing, wherein the retaining flange is configured for preventing the roller elements from falling out from the roller bearing from a first axial opening between the inner and the outer bearing ring elements at the first axial side. The roller bearing further comprises a first sealing ring element located at the first axial side for sealing the first axial opening, wherein the first sealing ring element is rotatable in relation to the inner bearing ring and seals against a sealing mating surface of the inner bearing ring. Moreover, the retaining flange comprises at least one filling slot configured for allowing the roller elements to be inserted in-between the inner and the outer bearing ring elements via the at least one filling slot during assembly of the roller bearing, and the sealing mating surface being located axially outside the at least one filling slot. Just for the sake of clarity, axially outside means that the sealing mating surface is located axially outside the filling slot relative an axial center of the bearing, i.e. the filling slot is located axially between the axial center of the bearing and the sealing mating surface.

By the provision of the above-mentioned design, an improved self-aligning roller bearing may be provided having improved sealing performance. More particularly, by providing the sealing mating surface as specified herein in respect of the at least one filling slot, sealing will be effectuated in the complete circumference between the first sealing ring element and the inner bearing ring element. Thereby, an improved sealing performance may be provided for the roller bearing comprising the at least one filling slot. Hence, the present invention provides high sealing performance, good running performance due to the retaining flange and facilitated assembly/disassembly of the bearing due to the at least one filling slot. The improved sealing performance may avoid contaminants/debris from entering the bearing, and it may additionally prevent lubricant, such as grease or oil, from leaking out from the bearing.

Optionally, the sealing mating surface may further be located radially inside the at least one filling slot. By further locating the sealing mating surface radially inside the location of the filling slot, a further facilitated assembly/disassembly of the bearing may be effectuated while also maintaining the improved sealing performance. With "radially inside" is herein meant that the sealing mating surface is located at a radial distance from the center/rotation axis of the roller bearing which is smaller than a radial distance from the center/rotation axis of the roller bearing to the at least one filling slot.

In this document, the expressions "axial" and "radial" are used. Unless expressed otherwise, axial refers to an axial extension of the roller bearing which is parallel to the center/rotation axis of the roller bearing. Radial refers to an extension of the roller bearing which is perpendicular to the axial extension.

Optionally, the sealing mating surface may be outwardly tapered, i.e. the surface tapers out from the axial center of the roller bearing. Such a shape of the sealing mating surface may further facilitate sealing performance and it may further facilitate assembly/disassembly of the roller bearing.

Optionally, the roller bearing may further comprise a lubrication reservoir which is provided as a cavity extending along the circumference of the inner bearing ring element and which is further defined by an axial gap between the retaining flange and the first sealing ring element and a radial gap between the sealing mating surface and a radially outmost position of the retaining flange. Thereby, by designing the roller bearing such that there also is a lubrication reservoir in the defined space, an improved lubrication for the bearing may be provided. This may also be advantageous in preventing contaminants/debris from entering the bearing since the lubrication reservoir may function as an additional sealing barrier.

Optionally, the first sealing ring element may comprise a detachable resilient seal ring sealing against the sealing surface. Still optionally, the detachable resilient seal ring may be attachable to the first sealing ring element via a circumferential groove provided on the first sealing ring element. By the provision of the above optional advantageous configurations of the first sealing ring element, manufacturing, assembly etc. may be facilitated. Still further, the circumferential groove may be provided by at least a first and a second separate disc-shaped ring element which are connectable by one or more fastening elements inserted in one or more corresponding bores which extend through the first and the second disc-shaped ring elements, wherein the one or more fastening elements are configured such that they can only be released in an axially outwardly direction from the roller bearing. Thereby, a more reliable design may be provided which may reduce the risk of unnecessary bearing failures.

Optionally, the detachable resilient seal ring may comprise a circumferential seal lip sealing against the sealing mating surface.

Optionally, the first sealing ring element may be non-rotatably connected to the outer bearing ring element.

Optionally, the roller elements may be solid roller elements. This is especially advantageous for more demanding applications comprising high loads. A solid roller element may be defined as a roller element which is not hollow and which comprises a material core at the center of the roller element.

Optionally, the roller bearing may further be configured such that at least one of the roller elements may only be inserted in-between the bearing rings via the at least one filling slot in order to completely assemble the roller bearing.

Optionally, the roller bearing is a large roller bearing with an outer diameter of 1000 millimeters or more. Still optionally the roller bearing is a large roller bearing with an outer diameter of 1100, 1200, 1300 or 1400 millimeters or more. It has namely been realized that the invention is advantageous for larger bearings since larger bearings may preferably be provided with a filling slot for facilitating the assembly/disassembly operation.

Optionally, the self-aligning roller bearing may be a spherical roller bearing. Still optionally, the self-aligning roller bearing may be a double-row bearing, such as a double-row spherical roller bearing.

Optionally, the inner bearing ring element may further comprise a second retaining flange provided on a second axial side being located on an axially opposite side to the first axial side of the self-aligning roller bearing. Still optionally, the second retaining flange may be configured for preventing the roller elements from falling out from the roller bearing from a second axial opening between the inner and the outer bearing ring elements at the second axial side. Still further, the roller bearing may further comprise a second sealing ring element located at the second axial side for sealing the second axial opening, wherein the second sealing ring element is rotatable in relation to the inner bearing ring and seals against a second sealing mating surface of the inner bearing ring. Moreover, the second retaining flange may comprise at least one filling slot configured for allowing the roller elements to be inserted in-between the inner and the outer bearing ring elements via the at least one filling slot during assembly of the roller bearing, and the second sealing mating surface being located axially outside the at least one filling slot.

BRIEF DESCRIPTION OF THE DRAWINGS

Exemplifying and preferred embodiments of the present invention will now be described more in detail, with reference to the accompanying drawings, wherein.

Figure 1:
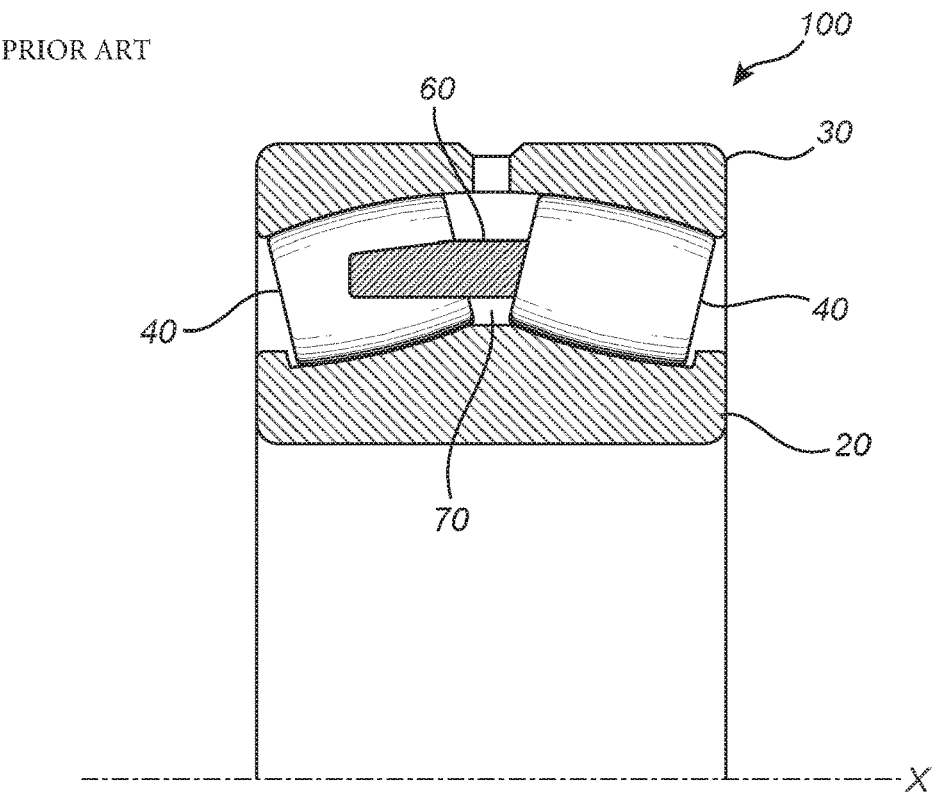
FIG. 1 shows an example of a prior art double-row spherical roller bearing.

The drawings show exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Throughout the detailed description, like reference numerals refer to like elements, unless explicitly expressed otherwise.

DETAILED DESCRIPTION

In FIG. 1, a cross-section of a prior art double-row spherical roller bearing 100 is depicted, which comprises an inner ring 20, an outer ring 30 radially opposing the inner ring 20, and a plurality of roller elements 40 interposed in-between the ring elements 20 and 30. The barrel-shaped roller elements 40 and corresponding raceway surfaces of the bearing rings 20 and 30 are configured such that the bearing rings 20 and 30 can be relatively misaligned in respect of a rotation axis X of the bearing 100. As can be further seen, the inner ring 20 presents flanges on the axial end sides of the bearing 100 which are used for preventing the rollers from falling out from the bearing 100. The bearing furthermore comprises a cage 60 for retaining the roller elements 40 and for keeping them at a distance from each other. Moreover, the bearing 100 is equipped with a guide ring 70 between the roller rows for guiding the rollers 40.

Figure 2:
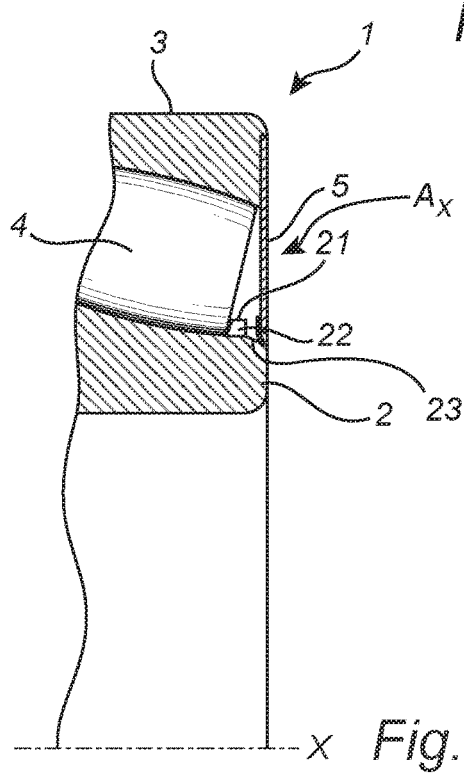
FIG. 2 is a cross sectional view of a self-aligning roller bearing according to an example embodiment of the present invention.

In FIG. 2, a cross-section of a part of a self-aligning roller bearing 1 according to an example embodiment of the present invention is depicted. The bearing 1 comprises an inner bearing ring element 2, an outer bearing ring element 3 and at least one row of roller elements 4 interposed in-between the inner 2 and the outer 3 bearing ring elements. The inner bearing ring element 2 and the outer bearing ring element 3 are arranged to relatively rotate in respect of a rotation axis X of the roller bearing 1. The roller bearing 1 also presents a self-aligning capability, meaning that the inner bearing ring element 2 and the outer bearing ring element 3 may be relatively misaligned in respect of the rotation axis X. The inner bearing ring element 2 comprises a retaining flange 21 provided on a first axial side of the roller bearing 1, wherein the retaining flange 21 is configured for preventing the roller elements 4 from falling out from the roller bearing 1 from a first axial opening Ax between the inner 2 and the outer 3 bearing ring elements at the first axial side. Moreover, the retaining flange 21 comprises at least one filling slot 22 configured for allowing the roller elements to be inserted in-between the inner 2 and the outer 3 bearing ring elements via the at least one filling slot 22 during assembly of the roller bearing 1. The roller bearing 1 further comprises a first sealing ring element 5 located at the first axial side for sealing the first axial opening Ax, wherein the first sealing ring element 5 is rotatable in relation to the inner bearing ring element 2 and seals against a sealing mating surface 23 of the inner bearing ring element 2, wherein the sealing mating surface 23 is located axially outside the at least one filling slot 22. As can be seen in the figure, "axially outside" means that the sealing mating surface 23 is located closer to the outer periphery of the bearing 1 than the retaining flange 21 at the first axial side of the bearing 1. The sealing mating surface 23 is in this embodiment also located radially inside the filling slot 22. Still further, in this embodiment, the sealing mating surface 23 is outwardly tapered.

Figure 3:
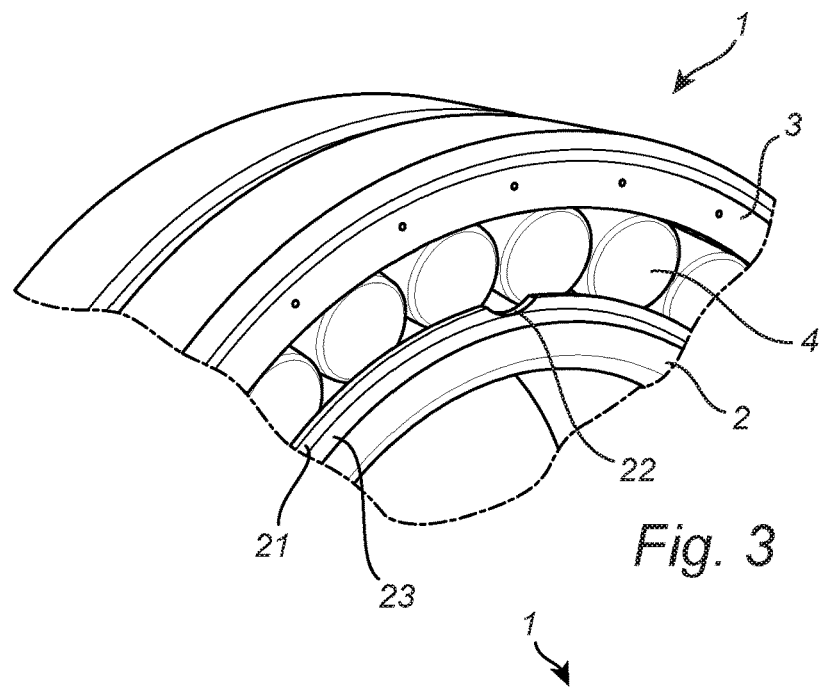
FIG. 3 shows a perspective view of a part of a self-aligning roller bearing according to an example embodiment of the present invention.

In FIG. 3, a perspective view of a roller bearing 1 as seen in FIG. 2 is depicted, with the difference that the first sealing ring element 5 is not shown in order to better illustrate the configuration of the inner ring element 2. Here, the retaining flange 21, the filling slot 22 and the sealing mating surface 23 of the inner ring 2 can be more clearly seen. The filling slot 22 is provided as an axially extending recess on the retaining flange 21, wherein the recess presents a radius which is large enough for allowing the roller elements 4 to be inserted into the bearing 1 via the at least one filling slot 22. As can also be seen in this figure, the tapered sealing mating surface 23 is located axially outside and radially inside, or radially below, the filling slot 22. Still further, which is optional, the sealing mating surface 23 is an integral part of the inner ring 2.

Figure 4:
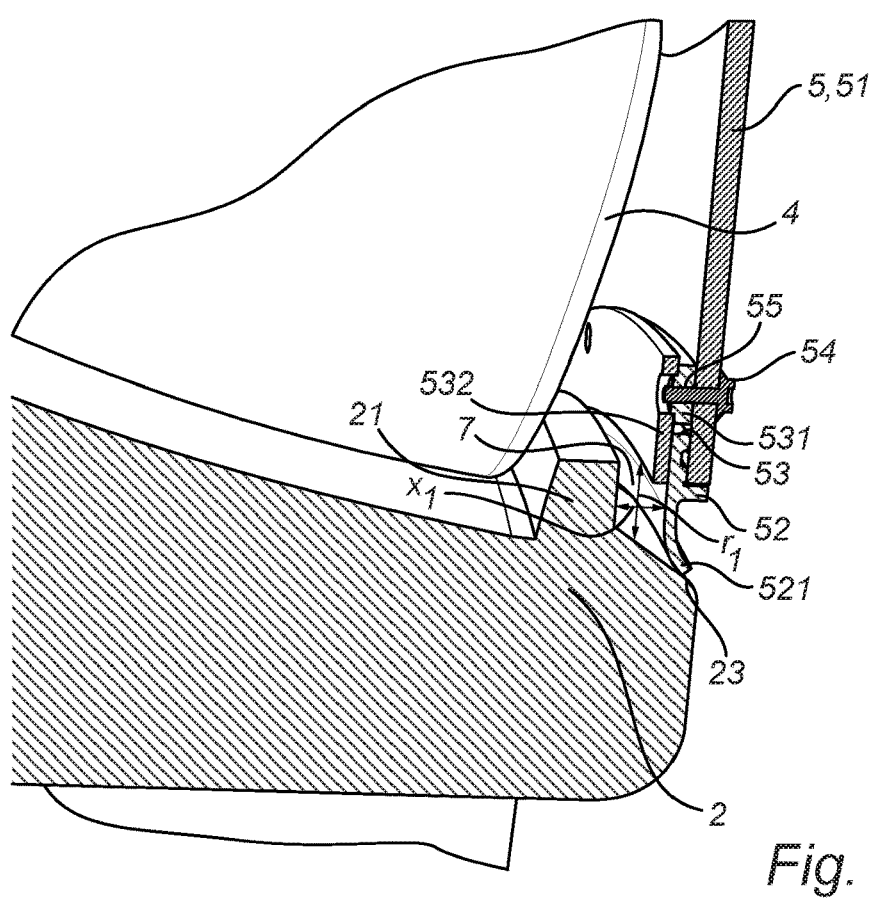
FIG. 4 shows a cross sectional view of a self-aligning roller bearing according to an example embodiment of the present invention.

In FIG. 4, a cross-section of a self-aligning roller bearing 1 according to an example embodiment of the present invention is depicted. As can be seen, the view is focusing on the axial end of the inner ring 2 where the retaining flange 21 and the sealing mating surface 23 are located. The sealing mating surface 23 is located axially outside and radially inside, or radially below, the at least one filling slot 22, which is not shown in this figure. Here, a more detailed view of a first sealing ring element 5 according to an example embodiment of the present invention is depicted. The first sealing ring element 5 comprises a first disc-shaped ring element 51 and a detachable resilient seal ring 52 sealing against the sealing mating surface 23 by means of a sealing lip 521. The resilient sealing ring 52 and the sealing lip 521 are preferably made of a resilient rubber material. The disc-shaped ring element 51 may for example be made of sheet metal or by a polymeric material or a combination thereof. In the case when the disc-shaped element is made of sheet metal, it may have been manufactured by a laser cutting process. Still further, the disc-shaped element 51 may comprise a coating, e.g. for corrosion protection. The detachable resilient seal ring 52 is partially arranged in a circumferential groove 53 of the seal ring element 5. In this embodiment, the groove 53 has been provided by three separate ring parts, which are the disc-shaped ring element 51, an intermediate ring element 531 and an additional disc-shaped ring element 532. The elements 51, 531 and 532 are connected by fastening elements 54 which are inserted in bores 55 extending through the three separate ring elements 51, 531 and 532. The fastening elements 54 are configured as bolts with a bolt head located on the outer side of the bearing 1. With the configuration, the bolts 54 may only be released axially outwardly from the bearing 1. As can be further seen from FIG. 4, the roller bearing 1 comprises a lubrication reservoir 7 provided as a cavity for storing lubricant, such as grease or oil. The reservoir 7 extends along the circumference of the inner ring element 2 and is further defined by an axial gap x1 between the retaining flange 21 and the first sealing ring element 5 and by a radial gap r1 between the sealing mating surface 23 and an outmost radial location of the retaining flange. Just as a matter of example, the axial gap x1 may be from 5 to 100 millimeters, such as from 5 to 90, 5 to 80, 5 to 70, 5 to 60, 5 to 50, 5 to 40 or 5 to 30 millimeters wide. Moreover, just as a matter of example, the radial gap r1 may be from 5 to 100 millimeters, such as from 5 to 90, 5 to 80, 5 to 70, 5 to 60, 5 to 50, 5 to 40 or 5 to 30 millimeters. It has been found that such a reservoir 7 may improve the lubrication of the bearing and it may also be used as a further sealing barrier preventing contaminants/debris from entering the inside of the bearing 1 where the roller elements 4 are located. The cavity 7 may not necessarily be pre-filled with lubricant, but rather the cavity 7 may be filled by lubricant during rotation of the bearing 1. Still further, the lubrication reservoir 7 may also be advantageous in that it may lubricate the resilient seal ring 52 during operation of the bearing 1, which in turn may increase the service life of the sealing ring 5.

Figure 5:
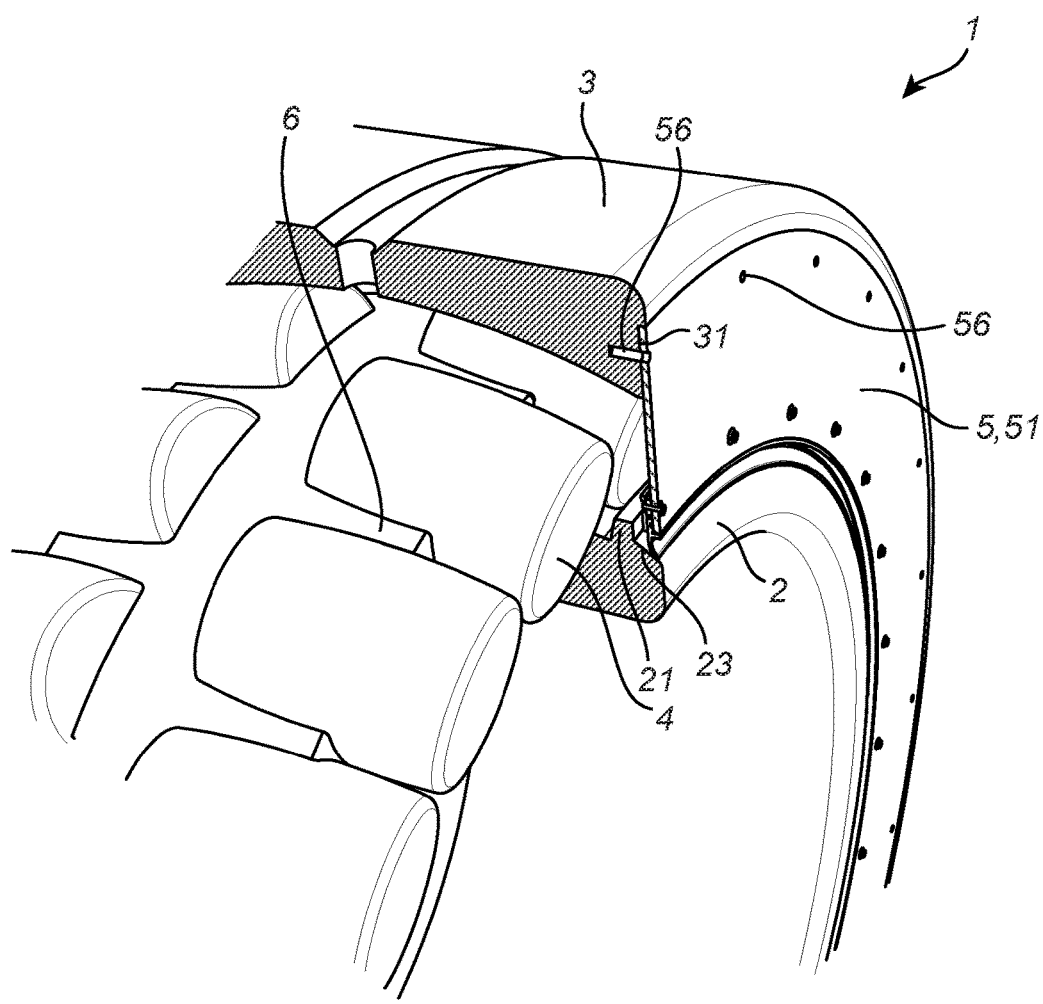
FIG. 5 shows a perspective view of a part of a self-aligning roller bearing according to an example embodiment of the present invention where details about the connection of the first sealing ring element to the bearing outer ring can be seen.

In FIG. 5, a perspective view of a self-aligning roller bearing 1 according to an example embodiment of the invention is depicted. The figure illustrates an example of how the first sealing ring element 5 may be connected to the outer ring 3. The sealing ring 5 is connected to the outer ring 3 by screws (not shown) inserted in bores 56 provided in the outer ring 3. In addition, the sealing ring 5 is arranged in a groove 31 on the outer ring 3 such that the sealing ring does not extend outside the axial end of the outer ring 3, thereby providing a compact bearing design. In the figure it can also be seen that the bearing 1 comprises a cage, or retainer, 6 for the roller elements 4.

The invention is not limited to the embodiments described herein. It would be evident for the skilled person that other embodiments and modifications to the embodiments specified hereinabove are also possible within the scope of the claims. For example, the configuration of only one axial side of the roller bearing has been described in detail herein. However, the second axial side of the bearing may also present a similar, or identical, configuration as the first axial side of the bearing according to anyone of the embodiments disclosed herein.

What is claimed is:

1. A self-aligning roller bearing, comprising,
   an inner bearing ring element,
   an outer bearing ring element,
   at least one row of roller elements interposed in-between the inner and the outer bearing ring elements, wherein
   the inner bearing ring element includes a retaining flange provided on a first axial side of the roller bearing, the retaining flange being configured for preventing the roller elements from falling out from the roller bearing from a first axial opening between the inner and the outer bearing ring elements at the first axial side, wherein the roller bearing further comprises,
   a first sealing ring element located at the first axial side for sealing the first axial opening, wherein the first sealing ring element is rotatable in relation to the inner bearing ring and seals against a sealing mating surface of the inner bearing ring,
   the retaining flange provides at least one filling slot configured for allowing the roller elements to be inserted in-between the inner and the outer bearing ring elements during assembly of the roller bearing, and
   the sealing mating surface being located axially outside the at least one filling slot.

2. The roller bearing according to claim 1, wherein the sealing mating surface is located radially inside the at least one filling slot.

3. The roller bearing according to claim 1, wherein the sealing mating surface is outwardly tapered.

4. The roller bearing according to claim 1, further comprising a lubrication reservoir having a cavity extending in the circumference of the inner bearing ring element and being further defined by an axial gap between the retaining flange and the first sealing ring element and a radial gap between the sealing mating surface and a radially outmost position of the retaining flange.

5. The roller bearing according to claim 1, wherein the first sealing ring element comprises a detachable resilient seal ring that seals against the sealing mating surface.

6. The roller bearing according to claim 5, wherein the detachable resilient seal ring is attachable to the first sealing ring element via a circumferential groove provided on the first sealing ring element.

7. The roller bearing according to claim 6, wherein the circumferential groove is provided by at least a first and a second separate disc-shaped ring element that are connectable by one or more fastening elements inserted in one or more corresponding bores extending through the first and the second disc-shaped ring elements, the one or more fastening elements being configured such that they can only be released in an axially outwardly direction from the roller bearing.

8. The roller bearing according to claim 5, wherein the detachable resilient seal ring comprises a circumferential seal lip that seals against the sealing mating surface.

9. The roller bearing according to claim 1, wherein the first sealing ring element is non-rotatably connected to the outer bearing ring element.

10. The roller bearing according to claim 1, wherein the roller elements are solid roller elements.

\* \* \* \* \*